United States Patent Office 2,766,277
Patented Oct. 9, 1956

2,766,277

PRODUCTION OF NEGATIVELY SUBSTITUTED N-TERTIARYALKYLARYLAMINES AND DERIVATIVES THEREOF

William K. T. Gleim, Orland Park, Ill., assignor to Universal Oil Products Company, Chicago, Ill., a corporation of Delaware No Drawing. Application February 8, 1951,
Serial No. 210,084

12 Claims. (Cl. 260—518)

This invention relates to a process for the alkylation of the amino group of an aromatic amine in which the aromatic ring is substituted by a negative group, such as a nitro, cyano, carboxylic acid or sulfonic acid group.

An object of this invention is to produce an N-tertiaryalkylarylamine having a negative substituent bound to the aryl ring.

A further object of this invention is to produce an N-tertiaryalkylnitroarylamine.

Another object of this invntion is to produce an N-tertiaryalkylnitroaniline.

A still further object of this invention is to produce N-tertiary-butyl-nitroaniline.

One embodiment of this invention relates to a process for producing an N-tertiaryalkylarylamine containing a substituent selected from the group consisting of a carboxyl group, a cyano group, a sulfonic acid group and a nitro group which comprises reacting a tertiary alkanol and a compound selected from the group consisting of an arylamine containing a negative substituent selected from the group consisting of a carboxyl group, a cyano group, a sulfonic acid group and a nitro group at an alkylation temperature in the presence of an acid catalyst.

Another embodiment of this invention relates to a process for producing a negatively substituted N-tertiaryalkylarylamine which comprises reacting a tertiary alkanol and an arylamine containing in ortho position to the amino group a negative substituent selected from the group consisting of a carboxyl group, a cyano group, a sulfonic acid group and a nitro group at an alkylation temperature in the presence of an acid catalyst.

An additional embodiment of this invention relates to a process for producing a negatively substituted N-tertiaryalkylarylamine which comprises reacting a tertiary alkanol and an arylamine containing in para position to the amino group a negative substituent selected from the group consisting of a carboxyl group, a cyano group, a sulfonic acid group and a nitro group at an alkylation temperature in the presence of an acid catalyst.

Still another embodiment of this invention relates to a process for producing an N-tertiaryalkylnitroarylamine which comprises reacting a nitroarylamine and a tertiary alkanol at an alkylation temperature in the presence of an acid catalyst.

Still an additional embodiment of this invention relates to a process for producing an N-tertiaryalkylnitroarylamine which comprises reacting a nitroarylamine and a tertiary alkanol at an alkylation temperature in the presence of a phosphoric acid catalyst.

A further embodiment of this invention relates to a process for producing an N-tertiaryalkylnitroarylamine which comprises reacting a nitroarylamine and a tertiary alkanol at an alkylation temperature in the presence of an alkane sulfonic acid catalyst.

A still further embodiment of this invention relates to a process which comprises reacting a nitroarylamine and a tertiary alkanol at an alkylation temperature in the presence of an aryl sulfonic acid catalyst.

Previous attempts to alkylate organic amines, particularly aromatic amines with tertiary alcohols in the presence of acid catalyst, have resulted in the production of a tertiary olefin and no formation of alkylation products. However, I have found that certain substituted arylamines may be alkylated readily with tertiary alcohols, particularly arylamines commonly referred to as negatively substituted arylamines in which there is bound to the aryl ring a substituent selected from the group consisting of a carboxyl group, a cyano group, a sulfonic acid group and a nitro group. In other words, the negative substituent facilitates the alkylation of the aromatic amino group. This effect is most pronounced when the negative substituent is in ortho or para position to the aromatic amino group. The effect is almost negligible when the negative substituent is situated in meta position to the aromatic amino group. For instance, the influence of the nitro group in the ortho, para, and meta position on the yield of N-alkyl product can be seen in the examples. The para nitro-N-tertiary butyl aniline was obtained in a 90% yield, the ortho nitro-N-tertiary butyl aniline in a 60% yield, while the meta nitro-N-tertiary butyl aniline was obtained in only a 10% yield.

The tertiary alcohols which may be so utilized include particularly tertiary alkanols such as tertiary butanol, tertiary pentanol and the like.

Acid catalysts which are particularly effective in promoting this process include phosphoric acids, alkane sulfonic acids and aryl sulfonic acids. These acids are good catalysts because they are also good solvents for negatively substituted arylamines. The phosphoric acids used in this process are particularly those in which the phosphorus has a valence of five and include orthophosphoric acid, pyrophosphoric acid, triphosphoric acid and other polyphosphoric acids having a higher ratio of phosphoric anhydride, $P_2O_5$, to water than is present in the mentioned triphosphoric acid. The alkane sulfonic acids include methane sulfonic acid and related compounds containing from 1 to about 20 carbon atoms per molecule. Also aryl sulfonic acids such as benzene sulfonic acid, benzene disulfonic acid, toluene sulfonic acid, phenol sulfonic acid and the like may be used. The alkane sulfonic acids and aryl sulfonic acids have the general formula $RSO_3H$ in which R represents an alkyl group or any aryl group.

The operation of this process may be described in reference to the alkylation of a nitroarylamine by means of a tertiary alcohol such as tertiary butanol, tertiary pentanol and other tertiary alcohols containing from about 6 to about 20 carbon atoms per molecule. This process may be carried out in batch or continuous types of treatment at a temperature of from about 20° to about 100° C. in the presence of an acid catalyst of the types mentioned above namely a phosphoric acid, an alkane sulfonic acid and an aryl sulfonic acid. Thus in a typical batch type operation a nitroaniline is commingled with a phosphoric acid such as 85% orthophosphoric acid and then a tertiary alkanol such as tertiary butyl alcohol is added to the commingled mixture while the reaction temperature is maintained for a time of from about 0.5 to about 5 hours, and then the resultant reaction mixture is diluted with water in order to recover the alkylated nitroaniline.

The process may also be carried out in a continuous manner by directing streams of the nitroaniline, phosphoric acid catalyst and tertiary butyl alcohol through a suitable reactor in which these materials are mixed with one another to effect reaction at a controlled temperature as indicated above and at a pressure sufficient to keep the reaction mixture in substantially liquid phase. The reactor through which the alkylation mixture is being passed may also be provided with baffles or other mixing means to facilitate the alkylation reaction. The reaction product obtained either from the batch type of operation or from continuous alkylation treatment is subjected to suitable separation and fractionation means in order to separate the desired N-tertiaryalkylnitroarylamine from unconverted starting materials, the latter being suitable for recycling to the process.

The N-tertiaryalkyl-para-nitroaniline is useful as an intermediate in the synthesis of other organic compounds particularly N-tertiary butyl-para-phenylenediamine and N,N'-ditertiarybutyl-para-phenylenediamine and related compounds which are highly effective as oxidation inhibitors for hydrocarbon oils, vegetable oils, animal oils and the like.

N-tertiarybutyl-para-nitroaniline can be reduced with hydrogen in ethyl acetate solution in the presence of a nickel or palladium catalyst at a temperature of from about 20° to about 50° C. to form N-tertiarybutyl-para-phenylenediamine. The N-tertiarybutyl-para-phenylenediamine is then reacted with tertiarybutyliodide at a temperature of from about 0° to about 20° C. to form N,N'-ditertiarybutyl-para-phenylenediamine.

The nature of this invention is illustrated further by the following examples which should not be misconstrued to limit unduly the generally broad scope of the invention.

Example I

Para-nitroaniline was dissolved in orthophosphoric acid containing 85% by weight of $H_3PO_4$, and then 1.5 to 2 molar equivalents of tertiarybutylalcohol were added to the stirred reaction mixture all at once at a temperature not exceeding 60° C. This reaction mixture was slowly warmed to a temperature of from about 70° to about 80° C. for a time of 3 hours without stirring. The reaction mixture was then diluted with 10 times its volume of water in order to separate the resultant N-tertiarybutyl-para-nitroaniline from the reaction mixture. The precipitated reaction product was then mixed with a concentrated solution of sodium bicarbonate and extracted with ether. The contents of the ether extract were then dissolved in carbon disulfide. The purpose of this procedure was to remove unreacted para-nitroaniline which is kept in solution very tenaciously by the alkylated para-nitroaniline. By itself, para-nitroaniline is not very soluble in most organic solvents with the exception of ketones and the lower fatty acids, but in the presence of the alkylated para-nitroaniline it will dissolve in most organic solvents with the exception of the paraffins. Fractional precipitation of tertiarybutyl-para-nitroaniline from benzene by means of pentane yielded a product containing 175 grams of alkylate from 138 grams (1 mol) of para-nitroaniline which corresponds to a yield of 90% of tertiarybutyl-p-nitroaniline. Diazotization was used to prove that N-alkylation had occurred. In the case of C-alkylation a water clear diazonium salt solution should result, while actually the acid insoluble nitrosamine with melting point 135° C. was obtained.

The tertiarybutyl-p-nitroaniline was dissolved in ethyl acetate and reacted with hydrogen at 20° C. in the presence of a nickel-diatomaceous earth catalyst (60% by weight nickel). The resultant product was N-tertiarybutyl-p-phenylenediamine.

In another run some of the solution of tertiarybutyl-p-nitroaniline in ethyl acetate was reduced with hydrogen also at 20° C. in the presence of a catalyst consisting of palladium supported by calcium carbonate to form N-tertiarybutyl-p-phenylenediamine.

The constitution of the N-tertiarybutyl-p-phenylenediamine was proven in the following way. This diamine was diazotized and the diazonium salt solution was reduced to the N-tertiarybutyl aniline by hypophosphorous acid. The N-tertiarybutyl aniline was identified by its boiling point of 215° C. and the melting point of its picrate which was 187° C. with decomposition. The mixed melting point of this picrate with the picrate of an authentic specimen showed no depression.

The N-tertiarybutyl-p-phenylenediamine formed as indicated above was effective as an oxidation inhibitor preventing the oxidative deterioration of a cracked Pennsylvania gasoline.

N-tertiarybutyl-para-phenylenediamine was also reacted with tertiarybutyliodide to form N,N'ditertiarybutyl-para-phenylenediamine which is also effective as an inhibitor for gasoline and other hydrocarbon oils and animal and vegetable oils.

Example II

Alkylation of orthonitroaniline with tertiarybutyl-alcohol was carried out by dissolving 14 grams of orthonitroaniline (0.1 mole) in 150 grams of orthophosphoric acid of 85% concentration by warming the mixture of acid catalyst and alcohol to 80° C., then cooling the mixture to 50° C. and adding all at once a 40 gram portion of tertiarybutylalcohol (0.5 mole). The reaction mixture was then warmed to a temperature of 70–80° C. on a water bath and kept at that temperature for three hours. Then the reaction mixture was cooled to 20° C. and diluted with 500 cc. of ice water. The resultant reaction mixture was neutralized partially by addition of 50 grams of sodium hydroxide and the resultant mixture was extracted with ether. The ether extract was washed with sodium bicarbonate solution, then dried and evaporated. The residual oil so isolated was distilled to obtain a fraction boiling from 75 to 90° C. at a pressure of 0.05 to 0.1 mm. of mercury. This red-yellow oil, part of which crystallized, was filtered to recover three grams of starting material and 12 grams of reaction product (60% yield) which was tertiarybutyl-ortho-nitroaniline. Diazotization produced the yellow N-tertiarybutyl-N-nitroso-o-nitroaniline with melting point of 159° C.

Example III

In a manner similar to that used in Example I and II, 14 grams (0.1 mole) of meta-nitroaniline was dissolved in 150 grams of 85% orthophosphoric acid by warming to 85° C. and then cooling to 60° C. after which 50 grams of tertiarybutylalcohol was added at one time, the resultant reaction mixture was then warmed to 70–80° C. for 2 hours and then permitted to cool to room temperature. The cooled reaction mixture was then diluted with 500 cc. of ice water and 50 grams of sodium hydroxide was added thereto. The precipitate which formed on addition of the sodium hydroxide was separated by filtration, dried, and then extracted with hexane. Most of the product was insoluble in the hexane and consisted of some of the originally charged meta-nitroaniline. The filtrate obtained from this product was evaporated and the oil residue which remained was distilled at 80 to 95° C. at a pressure of 0.1 to 0.2 mm. of mercury to give a 10% yield (2.0 grams) of tertiarybutyl-meta-nitroaniline. This reaction product was identified by the white N-tertiary-butyl-N-nitroso-m-nitroaniline which was obtained by nitrosation in acid solution, melting point 112° C.

Example IV 14 grams of para-aminobenzoic acid (0.1 mole) was dissolved in 150 grams of 85% orthophosphoric acid at a temperature of 70 to 80° C., the resultant reaction mixture was cooled to a temperature not higher than 60° and 50 grams of tertiarybutyl-alcohol was added thereto. During this run the reaction temperature was maintained at 70–80° C. for 3 hours and then the reactor was cooled to room temperature. The resultant mixture was then diluted with 500 cc. of ice water and partially neutralized by adding thereto 50 grams of sodium hydroxide which resulted in the recovery of 12 grams of precipitate. The 12 grams of crystalline material was dissolved in 100 cc. of hot propyl alcohol, the resultant solution was filtered to remove 4 grams of insoluble material and then the filtrate was cooled to separate 4.5 grams of crystals consisting of para aminobenzoic acid, starting material melting at 186–187°. The filtrate was evaporated on a water bath and the remaining oil crystallized to give 2 grams of a product melting at 152° C. and corresponding to N-tertiarybutyl-para-aminobenzoic acid. Nitrosation in acid solution yielded the N-tertiarybutyl-N-nitroso-p-aminobenzoic acid melting at 192° C. and insoluble in diluted mineral acid. This nitrosamine proved that N-alkylation had taken place and not C-alkylation on the aromatic ring.

I claim as my invention:

1. A process for producing a negatively substituted N-tertiaryalkylarylamine which comprises reacting a tertiary alkanol and a primary arylamine containing in ortho position to the amino group a negative substituent selected from the group consisting of a carboxyl group, a cyano group, a sulfonic acid group and a nitro group at an alkylation temperature of from about 20° to about 100° C. in the presence of an acid catalyst to alkylate the amino group of said arylamine.

2. A process for producing a negatively substituted N-tertiarylalkylarylamine which comprises reacting a tertiary alkanol and a primary arylamine containing in para position to the amino group a negative substituent selected from the group consisting of a carboxyl group, a cyano group, a sulfonic acid group and a nitro group at an alkylation temperature of from about 20° to about 100° C. in the presence of an acid catalyst to alkylate the amino group of said arylamine.

3. A process for producing an N-tertiaryalkylnitroarylamine which comprises reacting a tertiary alkanol and a primary nitroarylamine having the nitro group in one of the positions ortho and para to the amino group at an alkylation temperature of from about 20° to about 100° C. in the presence of an acid catalyst to alkylate the amino group of said nitroarylamine.

4. A process for producing an N-tertiaryalkylnitroarylamine which comprises reacting para-nitroaniline and a tertiary alkanol at an alkylation temperature of from about 20° to about 100° C. in the presence of an acid catalyst to alkylate the amino group of said nitroarylamine.

5. A process for producing an N-tertiaryalkylnitroarylamine which comprises reacting ortho-nitroaniline and a tertiary alkanol at an alkylation temperature of from about 20° to about 100° C. in the presence of an acid catalyst to alkylate the amino group of said nitroarylamine.

6. A process for producing an N-tertiaryalkylnitroarylamine which comprises reacting a tertiary alkanol and a primary nitroarylamine having the nitro group in one of the positions ortho and para to the amino group at an alkylation temperature of from about 20° to about 100° C. in the presence of a phosphoric acid catalyst to alkylate the amino group of said nitroarylamine.

7. A process for producing a negatively substituted N-tertiaryalkylarylamine which comprises reacting a tertiary alkanol and a primary arylamine containing, in one of the positions ortho and para to the amino group a negative substituent selected from the group consisting of a carboxyl group, a cyano group, a sulfonic acid group and a nitro group at a temperature of from about 20° to about 100° C. in the presence of an acid catalyst to alkylate the amino group of said arylamine.

8. A process for producing an N-tertiarylalkylnitroarylamine which comprises reacting a tertiary alkanol and a primary nitroarylamine having the nitro group in one of the positions ortho and para to the amino group at a temperature of from about 20° to about 100° C. in the presence of an alkane sulfonic acid catalyst to alkylate the amino group of said nitroarylamine.

9. A process for producing an N-tertiaryalkylnitroarylamine which comprises reacting a tertiary alkanol and a primary nitroarylamine having the nitro group in one of the positions ortho and para to the amino group at a temperature of from about 20° to about 100° C. in the presence of an aryl sulfonic acid catalyst to alkylate the amino group of said nitroarylamine.

10. A process for producing an N-tertiaryalkylcarboxyarylamine which comprises reacting para aminobenzoic acid and a tertiary alkanol at an alkylation temperature of from about 20° to about 100° C. in the presence of an acid catalyst to alkylate the amino group of said acid.

11. A process for producing a negatively substituted N-tertiaryalkylarylamine which comprises reacting a tertiary alkanol and a primary arylamine containing in one of the positions ortho and para to the amino group a negatively substituent selected from the group consisting of carboxyl, cyano, sulfonic acid and nitro radicals in the presence of an acid catalyst selected from the group consisting of phosphoric, alkane sulfonic and aryl sulfonic acids at an alkylation temperature of from about 20° to about 100° C. to alkylate the amino group of said arylamine reactant.

12. A process for producing a negatively substituted N-tertiaryalkylarylamine which comprises reacting a tertiary alkanol and a primary arylamine containing in one of the positions ortho and para to the amine group a negative substituent selected from the group consisting of carboxyl, cyano, sulfonic acid and nitro radicals in the presence of a phosphoric acid catalyst at a temperature of from about 20° to about 100° C. to alkylate the amino group of said arylamine reactant.

References Cited in the file of this patent

UNITED STATES PATENTS

| 1,908,190 | Schollkopf | May 9, 1933 |
| 1,994,851 | Carleton et al. | Mar. 19, 1935 |
| 1,994,852 | Carleton et al. | Mar. 19, 1935 |
| 2,073,671 | Andrews | Mar. 16, 1937 |
| 2,198,260 | Melsen | Apr. 23, 1940 |
| 2,275,312 | Tinker et al. | Mar. 3, 1942 |
| 2,391,139 | Dickey et al. | Dec. 18, 1945 |
| 2,692,287 | Bell et al. | Oct. 19, 1954 |
| 2,692,288 | Bell et al. | Oct. 19, 1954 |

OTHER REFERENCES

Adams et al.: "Org. Reactions" (Wiley), vol. III, pp. 1–15, 56, 72.